(12) United States Patent
van de Burgt et al.

(10) Patent No.: US 12,483,441 B2
(45) Date of Patent: Nov. 25, 2025

(54) APPARATUS FOR A CONTROLLER AREA NETWORK

(71) Applicant: NXP B.V., Eindhoven (NL)

(72) Inventors: Rolf van de Burgt, Laag Zuthem (NL); Bernd Uwe Gerhard Elend, Hamburg (DE); Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 318 days.

(21) Appl. No.: 18/064,436

(22) Filed: Dec. 12, 2022

(65) Prior Publication Data

US 2023/0198807 A1   Jun. 22, 2023

(30) Foreign Application Priority Data

Dec. 17, 2021   (EP) ..................................... 21215663

(51) Int. Cl.
*H04L 12/66* (2006.01)
*H04L 12/40* (2006.01)
*H04L 12/413* (2006.01)

(52) U.S. Cl.
CPC .......... *H04L 12/66* (2013.01); *H04L 12/4135* (2013.01); *H04L 2012/40215* (2013.01)

(58) Field of Classification Search
CPC .................. H04L 12/66; H04L 12/4135; H04L 2012/40215
See application file for complete search history.

(56) References Cited

U.S. PATENT DOCUMENTS

| 10,439,840 | B1 * | 10/2019 | Elend | H04L 5/0044 |
| 10,922,264 | B1 * | 2/2021 | Adamson | H04L 63/1458 |
| 11,316,623 | B2 * | 4/2022 | Lyu | H04L 1/0018 |
| 11,356,475 | B2 * | 6/2022 | Ujiie | H04L 63/12 |
| 2014/0365693 | A1 * | 12/2014 | Monroe | G06F 3/00 710/105 |
| 2015/0095532 | A1 * | 4/2015 | Muth | G06F 3/00 710/105 |
| 2015/0095711 | A1 * | 4/2015 | Elend | H04L 12/4135 714/39 |
| 2015/0347218 | A1 * | 12/2015 | Domingues | H04L 1/0082 714/48 |

(Continued)

FOREIGN PATENT DOCUMENTS

| CN | 111308922 A | * | 6/2020 | ......... G05B 19/0423 |
| CN | 112083710 A | * | 12/2020 | ......... G05B 23/0213 |

(Continued)

*Primary Examiner* — Shean Tokuta

(57) ABSTRACT

An apparatus for use with a Controller Area Network ("CAN") transceiver includes a first input for receiving transmit-data and a second input for receiving receive-data. The transmit-data includes data generated by a CAN controller to cause a CAN transceiver to transmit signalling that represents the transmit-data on the CAN bus and the receive-data indicates signalling from the CAN bus. The apparatus is configured to detect, in the receive-data, one or more fields of a CAN frame. The apparatus is then configured to prevent the CAN transceiver from transmitting the signalling that represents the transmit-data at times corresponding to the detected one or more fields of the CAN frame, thereby preventing an error frame in the transmit-data from being transmitted.

12 Claims, 4 Drawing Sheets

(56) References Cited

U.S. PATENT DOCUMENTS

| | | | | |
|---|---|---|---|---|
| 2016/0323287 A1* | 11/2016 | Kishikawa | ........ | H04L 12/40026 |
| 2017/0013005 A1* | 1/2017 | Galula | ................ | H04L 63/1425 |
| 2017/0026198 A1* | 1/2017 | Ochiai | ................ | H04L 12/6418 |
| 2019/0173912 A1* | 6/2019 | Ujiie | ........................ | H04L 12/40 |
| 2020/0174958 A1* | 6/2020 | Mosko | ............. | H04L 12/40032 |
| 2021/0058495 A1* | 2/2021 | Yamakawa | ............. | H04L 69/18 |
| 2021/0400056 A1* | 12/2021 | Klösters | ................ | H04L 63/123 |
| 2022/0070022 A1* | 3/2022 | van de Burgt | .......... | H04L 7/033 |
| 2022/0174073 A1* | 6/2022 | Kneib | ................. | H04L 63/1441 |
| 2023/0198799 A1 | 6/2023 | van de Burgt et al. | | |
| 2023/0198807 A1* | 6/2023 | van ee Burgt | .......... | H04L 12/66 370/363 |

FOREIGN PATENT DOCUMENTS

| | | | | | |
|---|---|---|---|---|---|
| CN | 108063687 B | * | 1/2021 | ......... | H04L 41/0677 |
| CN | 110708166 B | * | 7/2022 | ........... | B60R 25/307 |
| CN | 116471139 A | * | 7/2023 | ....... | H04L 12/40013 |
| CN | 118509278 A | * | 8/2024 | ........... | H04L 49/901 |
| DE | 102014208788 A1 | | 12/2014 | | |
| EP | 2985955 A1 | * | 2/2016 | ....... | H04L 12/40169 |
| EP | 3772840 A1 | * | 2/2021 | ......... | G06F 13/4221 |
| EP | 4109826 A1 | * | 12/2022 | ............. | H04W 4/40 |
| EP | 4199435 A1 | * | 6/2023 | ....... | H04L 12/40032 |
| EP | 4199437 A1 | * | 6/2023 | ........... | H04L 12/417 |
| GB | 2583476 A | | 11/2020 | | |
| JP | 2016134913 A | * | 7/2016 | ............. | H04L 67/12 |
| JP | 2016524884 A | * | 8/2016 | ............. | H04W 76/28 |
| JP | 2018026791 A | * | 2/2018 | ....... | H04L 12/40026 |
| JP | 2020109953 A | * | 7/2020 | ....... | H04L 12/40104 |
| KR | 20140098703 A | * | 8/2014 | ....... | H04L 12/40006 |
| KR | 101473144 B1 | * | 12/2014 | ........ | G01R 31/3183 |
| WO | WO-2014039035 A1 | * | 3/2014 | ....... | H04L 12/40013 |
| WO | WO-2015137164 A1 | * | 9/2015 | ............. | H04L 12/40 |
| WO | WO-2016116973 A1 | * | 7/2016 | ............. | H04L 12/28 |
| WO | WO-2018008453 A1 | * | 1/2018 | ............. | H04L 12/28 |
| WO | WO-2018020833 A1 | * | 2/2018 | ............. | H04L 12/40 |
| WO | WO-2019227076 A1 | * | 11/2019 | ............. | H04W 4/50 |

* cited by examiner

APPARATUS FOR A CONTROLLER AREA NETWORK

CROSS-REFERENCE TO RELATED APPLICATIONS

This application claims the priority under 35 U.S.C. § 119 of European patent application no. 21215663.2, filed Dec. 17, 2021 the contents of which are incorporated by reference herein.

FIELD

The present disclosure relates to an apparatus for a controller area network (CAN) transceiver. It also relates to a CAN node, a method of operating the apparatus and a computer readable medium.

BACKGROUND

In-vehicle network (IVN) buses, such as CAN (Controller Area Network), CAN FD (CAN with Flexible Data-Rate), LIN (Local Interconnect Network), FlexRay, Ethernet based network buses, and other types, can be used for communications within vehicles. For example, controller area network (CAN) bus is a message-based communications bus protocol that is often used within automobiles. It will be appreciated that CAN networks also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard.

SUMMARY

According to a first aspect of the present disclosure there is provided an apparatus for a Controller Area Network ("CAN") transceiver. The apparatus includes: a first input for receiving transmit-data, the transmit-data comprising data generated by a CAN controller to cause a CAN transceiver to transmit signalling that represents said transmit-data on the CAN bus; and a second input for receiving receive-data, the receive-data indicative of signalling from the CAN bus. The apparatus is configured to: detect, in said receive-data, one or more fields of a CAN frame; and prevent transmission, by said CAN transceiver, of said signalling that represents said transmit-data at times corresponding to said detected one or more fields of the CAN frame to at least prevent an error frame in said transmit-data being transmitted.

In one or more examples, said apparatus is configured to detect error frames in the transmit-data and to detect the occurrence of an error in said receive-data according to one or more rules, wherein the apparatus is configured to prevent transmission if said transmit-data contains an error frame and the apparatus does not detect the occurrence of an error in said receive-data.

In one or more embodiments, the apparatus is configured to detect, based on the receive-data, the occurrence of an error in said receive-data according to one or more rules, and wherein the apparatus is configured to provide for transmission of an error signal or error frame on the CAN bus based on the occurrence of the error.

In one or more embodiments, the apparatus is configured to provide said transmission of the error frame or error signal at least at times corresponding to said detected one or more fields of the CAN frame.

In one or more embodiments, said one or more rules used for determining the occurrence of the error in said receive-data include any one or more of the following rules: 1) a stuff error rule, the stuff error rule defining adherence to a stuffing rule for the CAN protocol; 2) a CRC error rule, the CRC error rule defining that the CRC field indicates that the data in the data field is correct; 3) a form error rule, the form error rule defining one or more expected values of predetermined bits in a CAN frame according to the CAN protocol; and/or 4) a bit error rule, the bit error rule defining that bits in the transmit-data should be seen in the receive-data.

In one or more embodiments, said apparatus is configured to determine, based on said receive-data and said transmit-data during an arbitration field of a CAN frame, whether arbitration was won or not won. If it is determined that arbitration was not won, said one or more fields of the CAN frame comprise any one or more of the following: 1) a data field; 2) a portion of an arbitration field following a time arbitration is lost; 3) a cyclic redundancy check field; 4) an interframe space; and/or 5) an end-of-frame field.

In one or more embodiments, said apparatus is configured to determine, based on said receive-data and said transmit-data during an arbitration field of a CAN frame, whether arbitration was won or not won. If it is determined that arbitration was won, said one or more fields of the CAN frame comprise any one or more of the following: 1) an acknowledgement field; 2) an end-of-frame field; and 3) an interframe space.

In one or more embodiments, the apparatus is configured to store a security level index. The security level index includes at least a first value or a second value, different from the first value. The number of said detected one or more fields of the CAN frame in which the apparatus is configured to prevent transmission includes a first number when said security level index comprises the first value. The number of said detected one or more fields of the CAN frame in which the apparatus is configured to prevent transmission includes a second number when said security level index comprises the second value and the second number is larger than the first number.

In one or more embodiments, the apparatus is configured to store a security level index, wherein the security level index comprises at least a first value or a second value, different to the first value. The detected one or more fields of the CAN frame in which the apparatus is configured to prevent transmission comprises a first selection when said security level index includes the first value; and the detected one or more fields of the CAN frame in which the apparatus is configured to prevent transmission comprises a second selection, different from the first selection, when said security level index comprises the second value.

In one or more embodiments, the apparatus is configured to change the security level index from the first value to the second value based on detection of one or more anomalous events in the transmit-data, the one or more anomalous events determined based on a predetermined behaviour rule set.

In one or more embodiments, the apparatus is configured to change the security level index from the second value to the first value based on non-detection, over a predetermined time period or over a predetermined number of frames, of one or more anomalous events in the transmit-data, the one or more anomalous events determined based on a predetermined behaviour rule set.

In one or more embodiments, based on said apparatus providing for transmission of the error frame, the apparatus is configured to stop the prevention of the transmission by said CAN transceiver of said signalling that represents said transmit-data.

In one or more embodiments, the apparatus comprises part of a CAN transceiver; the first input is coupled to a TXD terminal of the CAN transceiver; and the second input is coupled to an output of a receiver module of the CAN transceiver, the receiver module configured to generate a digital bitstream based on the signalling of the CAN bus, the digital bitstream comprising said receive-data.

In one or more embodiments, the apparatus is configured to prevent transmission by said CAN transceiver of said signalling that represents said transmit-data by any one or more of the following: 1) modification of the transmit-data; 2) blocking of the transmit-data from receipt by a transmitter module of the CAN transceiver, the transmitter module configured to translate the transmit-data into differential voltage levels for on the CAN bus; and/or 4) blocking of the output of the transmitter module of the CAN transceiver, the transmitter module configured to translate the transmit-data into differential voltage levels and output said differential voltage levels to the CAN bus.

In one or more embodiments, the apparatus is configured to, based on detection of an error frame in said transmit-data and wherein the apparatus acts to prevent transmission, modify said receive-data such that it appears to the CAN controller that the error frame was transmitted on the CAN bus.

In one or more examples, the apparatus is configured to, based on said prevention of transmission of said signalling that represents said transmit-data and said modification of the receive-data, provide for transmission of an overload flag on the CAN bus and, following said modification of the receive-data and prior to said overload flag, block the receive-data from being provided to the CAN controller.

According to a second aspect of the disclosure, a method for operating a CAN transceiver is provided. The method includes receiving, a first input, transmit-data comprising data generated by a CAN controller to cause a CAN transceiver to transmit signalling that represents said transmit-data on a CAN bus; receiving, at a second input, receive-data indicative of signalling from the CAN bus; detecting, in said receive-data, one or more fields of a CAN frame; and preventing transmission by said CAN transceiver of said signalling that represents said transmit-data at times corresponding to said detected one or more fields of the CAN frame to at least prevent an error frame in said transmit-data being transmitted.

According to a third aspect of this disclosure, a computer readable medium comprises computer program code, which when executed, is configured to cause a processor perform the method of the second aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
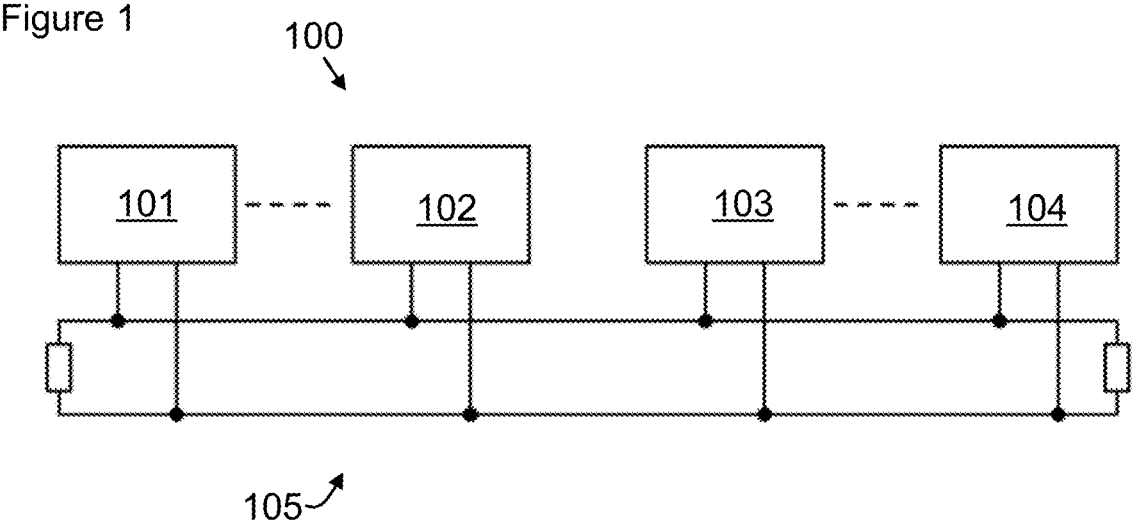
FIG. 1 shows an example embodiment of a plurality of CAN nodes connected to a common CAN bus.

Example FIG. 1 shows a CAN bus system 100 with a plurality of nodes or ECUs (Electronic Control Units) 101-104 connected to the same CAN bus wires 105 comprising a first CANH wire and a second CANL wire. The nodes 101-104 may comprise nodes that implement Classical CAN, CAN FD nodes that implement the CAN FD protocol or CAN XL nodes that implement the new CAN XL protocol.

Figure 2:
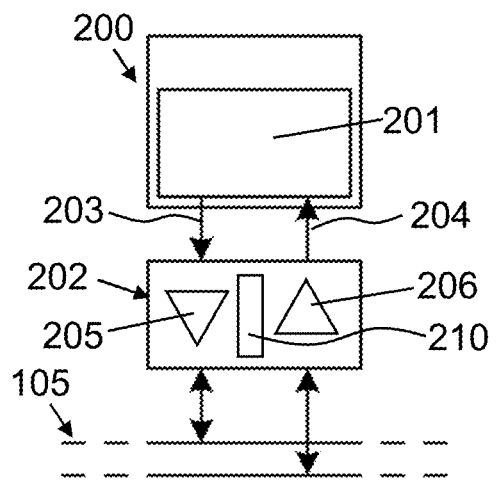
FIG. 2 shows an example CAN node comprising a CAN controller coupled with a CAN transceiver, the CAN transceiver providing the coupling to the CAN bus and wherein the CAN transceiver includes an example apparatus for controlling transmission of signalling on the bus that represents transmit-data received from the CAN controller.

Example FIG. 2 shows one of the nodes 101-104 in more detail. A node mainly comprises a CAN controller 200, such as a microcontroller, that implements the CAN, CAN FD or CAN XL protocol such as by using an embedded CAN, CAN FD or CAN XL protocol controller 201. The CAN controller 200 may be known as a host. The controller 200 and, more particularly, the protocol controller 201 is connected to the CAN bus 105 by a CAN transceiver 202. The CAN controller 200 is connected to the CAN transceiver 202 through two interface connections called TXD (Transmit Data) 203 and RXD (Receive Data) 204. The controller may therefore have a transmit output terminal that couples with a transmit input terminal of the CAN transceiver 202. Likewise, the CAN transceiver 202 may have a receive output terminal that couples with a receive input terminal of the CAN controller 200. The transceiver 202 is used to convert transmit data, comprising a digital bit stream on TXD 203, into analogue signalling on the bus wires 105 using a transmitter module 205. The transceiver 202 is also used to convert analogue signalling from the bus 105 into receive data comprising a digital output signal or bit stream by a receiver module 206 for providing to the RXD connection 204. The transmitter module 205 is thus configured to convert the transmit data into dominant bit and recessive bit differential signals for the bus 105. The receiver module 206 is thus configured to receive the differential signals from the bus 105 and determine the presence of either a dominant bit or a recessive bit and generate the receive data based thereon. In general, the CAN transceiver comprises an interface device to the network and the CAN controller comprises a controller that is configured to transmit data to and receive data from the network via the interface device.

In one or more examples, and for context, if node 103 is transmitting a CAN frame, the receiving nodes 101, 102 and 104, are, according to the CAN protocol, configured to verify the received frame and may acknowledge the frame or invalidate the frame with an error frame. The error frame can be transmitted during the frame or in an End Of Frame (EOF) field (described below in relation to FIG. 4). If there is an error frame transmitted on the bus, all receiving nodes 101, 102, 104 will discard the frame they just received and the transmitting node 103 will optionally retry to transmit the frame for a number of times. With this property each node has a veto with which it can invalidate a frame on the bus 105. If a node has a CAN controller or associated host with a defect or compromised software, it can occur that the node will try to invalidate CAN frames that are received correctly and that should have been acknowledged according to the CAN protocol. For safety and security reasons this may be unwanted behaviour.

An apparatus according to embodiments herein may, in one or more examples, act as a guardian to monitor and possibly take over the error frame transmission task from a local host. In one or more examples, the apparatus may prevent the local host transmitting error frames on the bus during predefined phases or fields of the CAN frame. In one or more examples, said predefined fields may change over time.

Thus, in one or more example embodiments of the disclosure, the CAN transceiver 202 may additionally include an apparatus 210 for controlling when the CAN transceiver 202 provides the signalling to the bus 105 in response to receipt of the transmit data from the CAN controller 200 on TXD 203. In one or more examples, the apparatus 205 may be configured to block or allow the transmit data received on TXD 203 from being received by the transmitter module 205 of the CAN transceiver 202.

The apparatus 210 may also receive the receive data from the receiver module 206 that is to be provided to the CAN controller on RXD 204. The apparatus 210 may be CAN protocol aware, meaning that it can identify one or more parts of a CAN frame and provide its control in response to one or more parts of the CAN frame being transmitted and/or present in the signalling on the bus 105. The apparatus 210 may include a CAN ISO11898 compliant receiver that is capable of decoding frames on the bus 105. However, it will be appreciated that it may not require all the functionality provided in ISO11898 and may, instead, be configured to decode CAN frames according to one or more predetermined decoding rules, which may be derived from or comprise a subset of the rules defined in ISO11898 for a CAN receiver.

Figure 3:
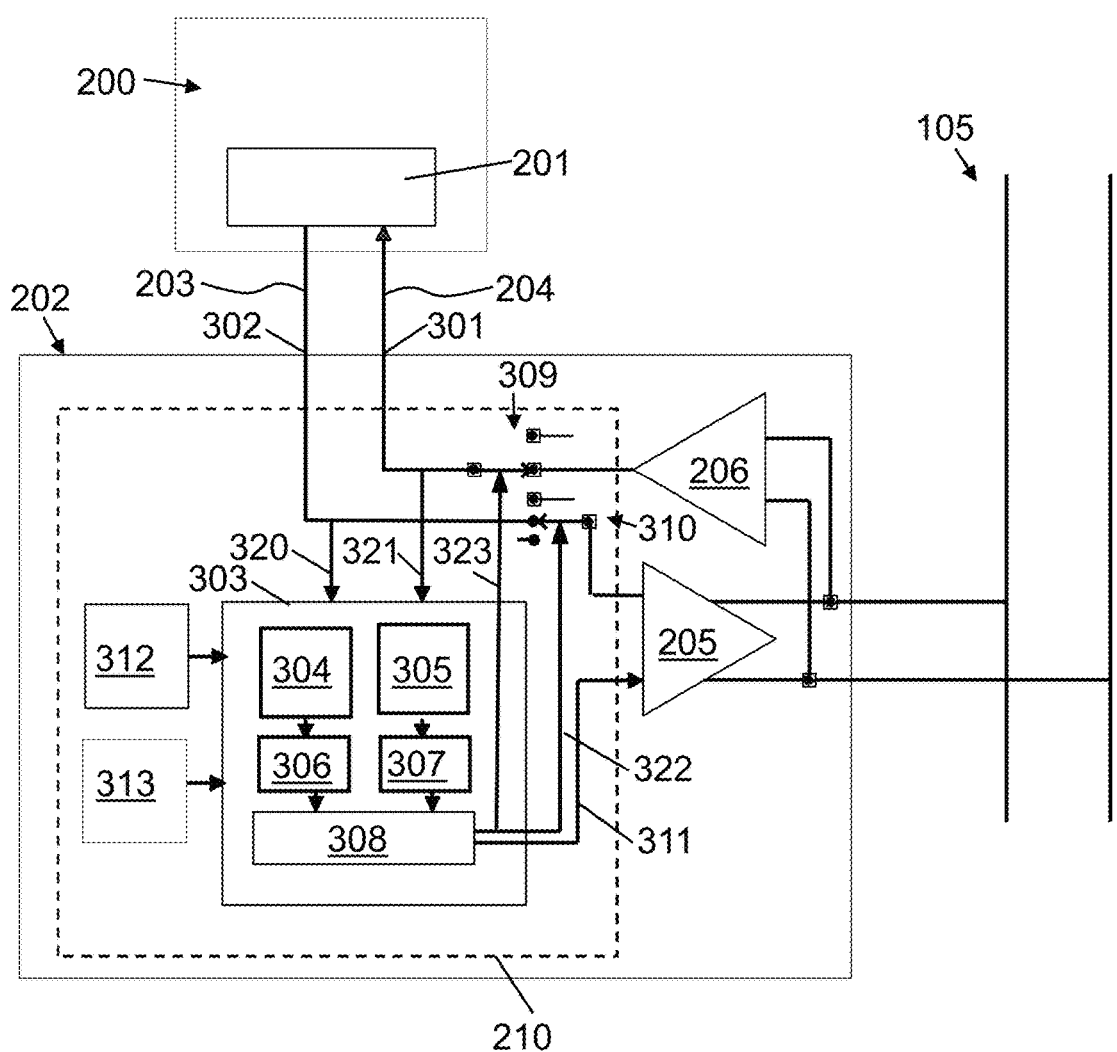
FIG. 3 shows a more detailed view of an example apparatus.

A more detailed view of the apparatus 210 is provided in FIG. 3. FIG. 3 shows an example of the functional parts the apparatus 210 may require to implement the control. The same reference numerals as used in FIG. 2 are also used in FIG. 3 for like parts.

In summary, the apparatus 210 is for a CAN transceiver. In FIG. 3, the apparatus 210 is shown as part of the CAN transceiver 202 and as an interface between the combination of the receiver module 206 and the transmitter module 205 and the receive output terminal 301 and the transmit input terminal 302. In other examples, the apparatus 210 may be external to the CAN transceiver 202, and couple to the receive output terminal 301 and the transmit input terminal 302. In such a configuration, the transmit-data from the CAN controller 200 may pass through the apparatus to the transmit input terminal 302 and the receive data received from the receive output terminal 301 may be passed to the CAN controller through the apparatus.

In whichever configuration, the apparatus 210 may comprise a first input 320 for receiving transmit-data generated by a CAN controller 200. The transmit-data, as will be familiar to those skilled in the art, causes the CAN transceiver 202 to transmit signalling that represents said transmit-data on the CAN bus, such as by way of the transmitter module 205. Further, the apparatus 210 may comprise a second input 321 for receiving receive-data, wherein the receive-data is indicative of signalling from the CAN bus 105, which may be received from the receiver module 206.

The apparatus 210 comprises protocol-and-sampling block 303 configured to read the CAN frames and signalling in the transmit-data and the receive-data. To provide such functionality and subsequent control, the protocol-and-sampling block 303 includes a first timing recovery block 304 for determining the signal timing in the transmit-data. Further, the protocol-and-sampling block 303 includes a second timing recovery block 305 for determining the signal timing in the receive-data. An edge-timing-check block 306 is configured to receive the transmit data and check the timing of the edges, that is transitions between dominant and recessive bits, in the transmit-data for errors or compliance with the CAN protocol. A bus-state block 307 is configured to determine the state of the bus from the receive data. Accordingly the bus-state block may be configured to determine one or more of the type of CAN frame being received, the part of the frame being received and whether the bus 105 is in use or not. A violation-detector-and-TXD-gating block 308 is configured to provide for detection of the violation of one or more predetermined rules in the transmit data. The violation of the one or more predetermined rules may be determined based on one or more bits of the transmit-data and the current state of the bus 105, determined from the receive-data.

The violation-detector-and-TXD-gating block 308 may be configured to perform one or more control actions.

In this example, a first control action comprises the violation-detector-and-TXD-gating block 308 being configured to manipulate the transmit data that is provided to the transmitter module 205 by way of one or more signals provided at a first output 322. The signals from the first output 322 may control switch 310. Switch 310 may interrupt the connection between the transmit input terminal 302 and the transmit module 205. In other examples, the signal 322 may be configured to insert or change bits in the transmit-data.

In this example and one or more other examples, a second control action comprises the violation-detector-and-TXDgating block 308 being configured to send error frames by providing appropriate signals to the transmit module 205 from second output 311.

In this example and one or more other examples, a third control action comprises the violation-detector-and-TXD-gating block 308 being configured to manipulate the receive-data that is provided to the CAN controller 200 by one or more signals provided at a third output 323. The signals from third output 323 may control switch 309. Switch 309 may interrupt the connection between the receive module 206 and the receive output terminal 301. In other examples, the signals at third output 323 may be configured to insert or change bits in the receive data.

The protocol-and-sampling block 303 may be configured to receive one or more reference signals to provide these functions. Thus, a bit-timing-settings block 312 is configured to store the bit rate setting for the CAN network, as will be familiar to those skilled in the art. A clock 313 provides a clock signal.

It will be appreciated that FIG. 3 provides one example of an implementation of the apparatus 210. In other implementations, the functions of the apparatus 210 described herein may be provided by a general purpose processor with appropriately configured software or a FPGA or a PLC or a dedicated die. Accordingly, in the description that follows, the functionality will be described as being provided by the apparatus 210 in general rather than by one or more of the blocks, such as block 308.

In the present examples, switch 310 is used to prevent transmission by said CAN transceiver of said signalling that represents said transmit-data. However in other examples, the prevention of transmission may be achieved by modification of the transmit-data such that an un-warranted error frame or the like is not present therein. In other examples, the apparatus may be configured to temporarily block the transmit-data from receipt by a transmitter module 205 of the CAN transceiver. In other examples, the apparatus may be configured to block the output of the transmitter module 205 of the CAN transceiver 202 and, as such, may include a switch at the output of the transmitter module 205 prior to the connection to the CAN bus 105.

Figure 4:
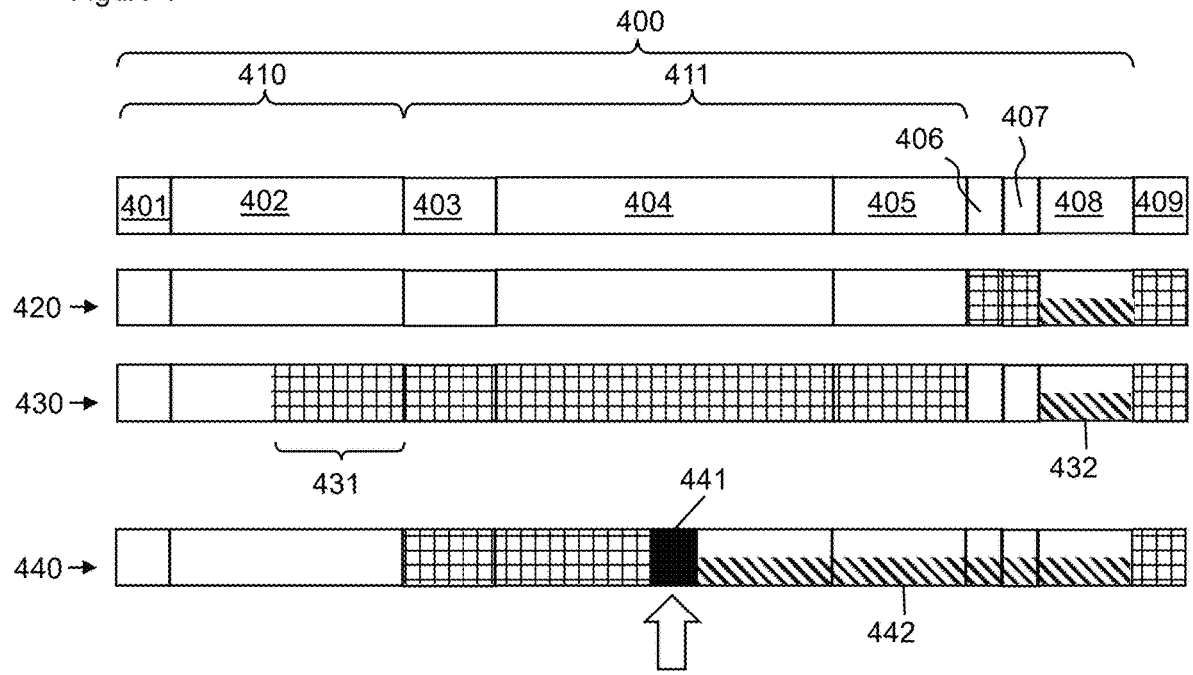
FIG. 4 shows a series of example CAN frames.

FIG. 4 shows a series of CAN frames 400 to illustrate the action of the apparatus. The structure of a typical CAN frame will be described first to highlight the parts thereof. The frame comprises a Start-of-Frame field 401 which designates the start of a CAN frame 400. An arbitration field 402 follows the Start-of-Frame field 401 in which it is determined which node 101-104 wins access to the bus 105. The arbitration field 402 may include signalling of an ID for the node 101-104, and may comprise an 11 or 29 bit ID. Following the arbitration field 402, the frame comprises a field of control bits 403, including IDE, FDF and res, which can be used for signalling the type of CAN protocol that will follow. A data field 404 follows the control bits field 403, which contains the data content of the frame. A CRC field 405 follows the data field 404, which contains error detection and/or error correction information. An acknowledgement field 406 follows. An acknowledgement Del field 407 follows. An end-of-frame field 408 indicates the end of the frame 400. An interframe space 409 is provided to provide an identifiable separation between different frames. The bus (and therefore the nodes) may be considered idle in this inter-frame space 409. A subsequent frame may then begin with the Start-of-Frame field. Thus, at time 410 multiple nodes will be transmitting, arbitrating for the bus. At time 411, only one node should be transmitting (except in the event of error or invalidation signals). At the acknowledgement field 406, the nodes 101-104 receiving the frame will become active.

The CAN frames 420 and 430 include shading to illustrate where in the CAN frame the apparatus 210 may exert its control.

Thus, the apparatus 210 is configured to detect, in said receive-data, one or more fields of a CAN frame, such as illustrated in FIG. 4. In the examples herein, the one or more fields detected by the apparatus 210 may include the inter-frame space 409, even though it is a part of the signalling between frames. Thus, the apparatus 210 may be configured to detect the end-of-frame field 408. In other examples, the apparatus 210 may be configured to detect the end-of-frame field 408 and the interframe space 409. Thus, the apparatus 210 may be protocol aware as much as necessary to identify the occurrence of the one or more fields of a CAN frame. Alternatively, the apparatus 210 may have the capability to identify a plurality of (or all) fields of the CAN frame and the one or more fields described above may comprise a subset of those. In one or more examples described herein, the apparatus 210 is configured to prevent transmission by said CAN transceiver of said signalling that represents said transmit-data at times corresponding to said detected one or more fields of the CAN frame to at least prevent an error frame in said transmit-data being transmitted. Thus, as described above, a CAN controller 200 that has a defect or compromised software, may try to invalidate CAN frames that are received correctly and that should have been acknowledged according to the CAN protocol. For safety and security reasons this may be unwanted behaviour. Thus, the apparatus 210 may be configured to act to prevent the transmission of error frames by the CAN controller during the one or more fields.

In a first example, the apparatus 210 may be configured to prevent the transmission of error frames by being configured to prevent transmission of signalling onto the bus during the one or more fields. Thus, the apparatus 210 may be configured such that it selectively silences the CAN controller during said one or more fields of the CAN frame, which may occur irrespective of what the CAN controller may be trying to send.

In one or more other examples, said apparatus 210 may be configured to detect error frames in the transmit-data, such as the CAN controller attempting to send an error frame. The apparatus 210 may further by configured to detect the occurrence of an error in said receive-data according to one or more rules. The apparatus 210 may thus be configured to determine whether the CAN controller is attempting to send an error frame in response to a genuine error or not. The apparatus 210 may therefore monitor the behaviour of the CAN controller by inspecting the transmit-data and/or controlling when the CAN transceiver provides the signalling to the CAN bus in response to the transmit-data. The apparatus 210 may be configured to prevent transmission if said transmit-data contains an error frame and the apparatus does not detect the occurrence of an error in said receive-data.

In one or more examples, the apparatus 210 is configured to, based on detection of an error frame in said transmit-data and wherein the apparatus acts to prevent transmission of the error frame by the CAN transceiver, modify said receive-data such that it appears to the CAN controller 200 that the error frame was transmitted on the CAN bus. By performing this action, it may appear to the CAN controller that its error frame was in fact transmitted (even when it was not) because, after a delay it can see what it will believe is the corresponding signalling on the bus 105. This may therefore hide the action of the apparatus 210 from the CAN controller 200. It will be appreciated that the detection of the error frame in said transmit-data may comprise detecting one or more dominant bits that arrive unexpectedly according to rules of the CAN protocol. Those one or more bits may thus be blocked to prevent transmission of them by the CAN transceiver.

The apparatus may be configured to then generate an overload flag on the bus. The overload flag helps the CAN controller 200 and the other CAN controllers coupled to the CAN bus 105 to reach the next intermission field at the same point in time; allowing all CAN controllers to equally participate in the next arbitration. The receive-data passed to the CAN controller may be modified by the apparatus in the period between its initial modification to make it appear the error frame was sent and the transmission of the overload flag. Thus, the "genuine" receive-data is blocked.

In one or more examples, the apparatus 210 may be configured to, at least in part, take responsibility for sending error frames from the CAN controller 201. It will be appreciated that because the apparatus 210 is configured to receive the transmit-data from the CAN-controller 200, it is downstream of the CAN controller and may therefore take responsibility for sending error frames with or without the CAN controller knowing (i.e. being able to detect) that the apparatus 210 is performing such a function. Thus, in one or more examples, the apparatus 210 may be configured to detect, based on the receive-data, the occurrence of an error in said receive-data according to one or more rules. The one or more rules may comprise a subset of the rules of the CAN protocol or may be based on the rules of the CAN protocol. The one or more rules may include adherence to one or more of timing of transmissions by the other nodes; transmissions by the other nodes conditional on whether arbitration was won or lost, CAN frame type, which may include CAN, CAN FD and CAN XL frame types and others. Thus, if the apparatus 210 determines that one or more of the rules have not been adhered to, then the apparatus 210 may be configured to provide for transmission of an error frame or error signal on the CAN bus based on the occurrence of the error and independent of the sending of an error frame or signal by the CAN controller, as could be observed in the transmit-data. An "error frame" may comprise a frame as defined by ISO11898-1. An "error signal" can be any signalling provided to the bus that corrupts the current frame.

In one or more examples, the responsibility for sending error frames may be shared with the CAN controller 201. Thus, the apparatus 210 may be configured to provide for said transmission of error frames at least at times that correspond to when said detected one or more fields of the CAN frame are currently present in the receive-data. Thus, at times when the apparatus 210 is configured to prevent transmission of signalling on the CAN bus that represents said transmit-data from the CAN controller, the apparatus 210 may provide for transmission of error frames, if errors are detected. Outside the times of the one or more fields of the CAN frame, the apparatus may allow for the CAN controller 200 to provide for transmission of error frames on the CAN bus 105.

In one or more examples, the one or more rules used for determining the occurrence of the error in said receive-data include a stuff error rule, the stuff error rule comprising adherence to a stuffing rule for the CAN protocol. Thus, for the CAN protocol, it is allowable for up to five bits to have the same value before a stuff bit is inserted to provide an edge for synchronisation. The stuff error rule thus determines whether the receive-data meets the CAN protocol stuffing rule. In one or more examples, the stuff error rule may include determining whether the CRC field 405 of a CAN FD frame includes the required four stuff bits defined in the protocol for CAN FD.

In one or more examples, the one or more rules used for determining the occurrence of the error in said receive-data include a form error rule configured to determine whether the value of predetermined bits in a CAN frame have invalid values according to the CAN protocol. For example, delimiter bits or reserved bits are expected to have a predetermined value and if that value is not detected then there is a form error.

In one or more examples, the one or more rules used for determining the occurrence of the error in said receive-data include a bit error rule, the bit error rule defining that bits in the transmit-data should be seen in the receive-data.

In one or more examples, the one or more rules used for determining the occurrence of the error in said receive-data include a CRC error rule, the CRC error rule defining that the CRC field 405 indicates that the data in the data field 404 is correct.

With reference to FIG. 4, the first CAN frame 420 illustrates the situation when arbitration is won by the CAN controller with which the apparatus 210 is associated. The second CAN frame 430 illustrates the situation when arbitration is lost by the CAN controller with which the apparatus 210 is associated.

The apparatus 210 may be configured to determine whether arbitration was won by the CAN controller 200 with which it is associated. In some examples, the apparatus 210 may be further configured to determine whether arbitration was not won or lost, by the CAN controller 200 with which it is associated. Thus, arbitration may be not won because it was lost or because the controller 200 did not participate in arbitration. Thus, by monitoring the "ID" received from the CAN bus in the receive-data and the ID sent by the CAN controller 200 in the transmit-data during the arbitration field 402 of a CAN frame, the apparatus 210 can determine if arbitration was won or lost, including the situation when the CAN controller 200 did not participate in arbitration. In one or more examples, the apparatus 210 may have predetermined information of the ID of the CAN controller with which it is associated and may therefore be configured to determine whether arbitration was won and/or not won or lost based on the receive-data and not the transmit-data.

If it is determined that arbitration was won (it will be appreciated that the determination may be made during the arbitration field or after), with reference to the first CAN frame 420, said one or more fields of the CAN frame may comprise any one or more of the following: 1) the acknowledgement field 406; 2) the CRC field 405; 3) the end-of-frame field 408; and/or 4) the interframe space 409.

Thus, during any one or more of these parts of the CAN frame (including the interframe space 409 between frames), with reference to second CAN frame 430, the apparatus 210 may be configured to prevent transmission by said CAN transceiver of the signalling on the bus that represents said transmit-data. Thus, the shading in these parts of the frame indicate where the apparatus 210 restricts transmission of the transmit-data onto the CAN bus by the CAN transceiver.

If arbitration was not won (e.g. lost or where the CAN protocol controller 201 did not participate in arbitration to win access to the CAN bus) then said one or more fields of the CAN frame may comprise one or more of: the data field 404; the end-of-frame field 408; and the interframe space 409. Further, the one or more fields of the CAN frame 430 may include a portion 431 of an arbitration field 402 following a time arbitration is lost. It will be appreciated that the node 101-104 with the lowest ID wins access to the bus and therefore it can be determined that arbitration has been lost before then end of the arbitration field if a node with a lower ID continues to participate in arbitration. Therefore, from the time point in the arbitration field that the CAN controller has lost, the apparatus 210 may be configured to prevent transmission of signalling that is based on the transmit-data.

The apparatus 210 may be configured to prevent transmission of the transmit-data dependent on a current security level. Thus, the apparatus 201 may be configured to monitor the behaviour of the CAN controller 200 by inspecting the transmit-data. The apparatus 210 may also receive the receive-data and may therefore be configured to determine whether the behaviour of the CAN controller 200 based on the transmit-data it is generating. Further, the apparatus may be configured to determine if the transmit-data is appropriate transmit-data in response to the receive-data from the CAN bus 105. Thus, the apparatus 210 may be configured to detect the occurrence of one or more anomalous events in the transmit-data, the one or more anomalous events determined based on a predetermined behaviour rule set. The predetermined behaviour rule set may include rules that define what is considered inappropriate or suspicious behaviour of the CAN controller 200. For example, the predetermined behaviour rule set may define rules based on the timing of bits in the transmit-data and the adherence to the fields of the CAN frame, which may not require knowledge of the receive-data to verify. In other examples, the predetermined behaviour rule set may include the generation of error frames when no error was detected by the apparatus 210, which may require the apparatus 210 to monitor the receive-data and the transmit-data to determine whether the CAN controller 201 was acting appropriately or not.

The current security level may be stored using a security level index, which indicates the current security level. Thus, if a predetermined number of anomalous events are detected, the current security level index may be increased. This may lead to the apparatus 210 being configured to prevent transmission of the transmit-data during a greater number of fields of the CAN frame. If no anomalous events are detected over a predetermined period, the current security level index may be decreased. This may lead to the apparatus 210 being configured to prevent transmission of the transmit-data during a fewer number of field of the CAN frame. There may be two or more or three or more security levels.

Figure 5:
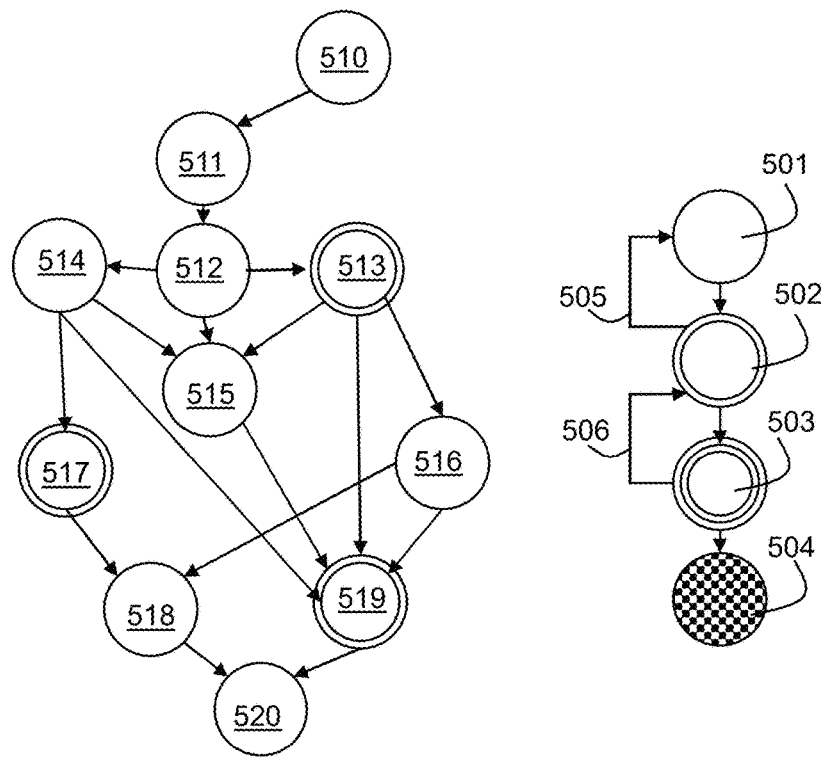
FIG. 5 shows an example state diagram.

Example FIG. 5 shows four security levels 501, 502, 503, 504. A first level 501 represents the CAN controller 200 being trusted. At this level, the apparatus 210 may be configured to allow the transmission of the signalling representative of the transmit-data. Second level 502 represents the apparatus being suspicious of the CAN controller's 200 behaviour and may indicate the introduction of restrictions on the one or more fields of the CAN frame in which the apparatus 210 prevents transmission of the transmit-data. The third level 503 designates a "forced passive" state in which the apparatus 210 is configured to prevent transmission for a greater proportion of the CAN frame. The fourth level 504 designates a "disconnected" state in which the apparatus 210 is configured to prevent transmission of all transmit-data and, in some examples, prevent receipt of receive-data by the CAN controller.

In this example, each occurrence of an anomalous events as defined in the predetermined behaviour rule set causes the apparatus 210 to increase the security level. However, if there are no occurrences of anomalous events as defined in the predetermined behaviour rule set for a predetermined time period or over a predetermined number of CAN frames, then the apparatus 210 may decrease the security level, as indicated at 505 and 506. However, once the fourth security level is reached, the apparatus 210 may be configured to require a reset before leaving the fourth security level. In one or more examples, the predetermined behaviour rule set may define one or more severe violations which, if they occur, cause the apparatus 210 to move directly to the fourth security level 504. It will be appreciated that other rules may be provided for when security levels should be increased or decreased.

FIG. 5 also shows an example state diagram of the apparatus 210. State 510 indicates the apparatus 210 being off. State 511 indicates an idle state while the apparatus awaits the transmit-data and the receive-data. State 512 shows the monitoring of the arbitration phase and thus, the arbitration field 402. State 513 shows the apparatus determining that arbitration was lost. State 513 is presented with a double line border indicating that at the second security level 502 or above, the apparatus 210 acts to prevent transmission of the transmit-data. This is shown in CAN frame 430 by the square pattern shading that begins in the arbitration field 431. If the apparatus detects an error at this time and the CAN controller 200 is trusted in the first security level 501, the apparatus stops preventing transmission and allows the CAN controller 200 to send an error frame to the bus at state 515. The apparatus then moves to state 519, which in the trusted state, provides no restriction on transmission in the end-of-frame field shown by the half shaded field 432. Alternatively, if the security level is the second security level 502 or above and an error 441 is detected, then the apparatus 210 moves to state 519 in which transmission is prevented for the rest of the frame as shown at 442 and in the end-of-frame field. The apparatus 210 then moves to idle state 520 and on to state 511.

State 514 comprises the state the apparatus 210 enters when it is determined that arbitration was won. If the CAN controller is currently trusted in the first security level 501, then the apparatus 210 does not restrict transmission. The apparatus 210 moves to state 517 after the CRC field 405 in which transmission is restricted if in the second security level or above. The apparatus moves to state 518 in which the end-of-frame field 408 is provided by the CAN controller without restriction. If the security level is in security level three 502 or greater the apparatus 210 moves to state 519 in which transmission during the end-of-frame field 408 is restricted as shown by the part shading in CAN frame 420. From state 514, the apparatus 210 may move to state 515 wherein if the security level is level two 502 or below and error frame may be permitted to be transmitted by the CAN controller.

Thus, in general, the apparatus 210 is configured to store a security level index 501, 502, 503, 504. The number of the one or more fields of the CAN frame in which the apparatus is configured to prevent transmission is lower (or a different selection of fields) when the security level index is lower. The number of the one or more fields of the CAN frame in which the apparatus is configured to prevent transmission is higher (or a different selection of fields) when said security level index is higher. In some examples, the apparatus may act to inhibit all transmission of signalling based on the transmit data when the security levels is higher.

Figure 6:
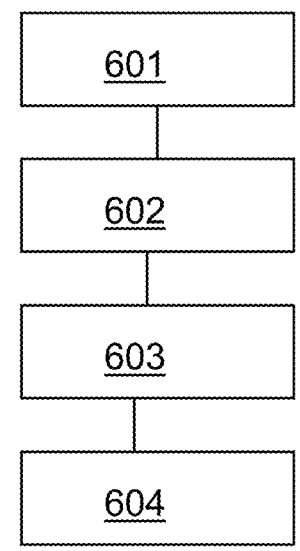
FIG. 6 shows an example method.

FIG. 6 illustrates an example method of for a Controller Area Network, CAN, transceiver, to provide for mitigation against a compromised CAN controller coupled to said CAN transceiver. The method includes: receiving 601, a first input, transmit-data comprising data generated by a CAN controller to cause a CAN transceiver to transmit signalling that represents said transmit-data on a CAN bus; receiving 602, at a second input, receive-data indicative of signalling from the CAN bus; detecting 603, in said receive-data, one or more fields of a CAN frame; and preventing 604 transmission by said CAN transceiver of said signalling that represents said transmit-data at times corresponding to said detected one or more fields of the CAN frame to at least prevent an error frame in said transmit-data being transmitted.

Figure 7:
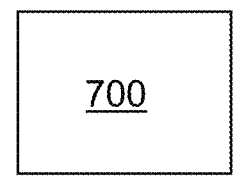
FIG. 7 shows a computer readable medium.

FIG. 7 shows a non-transitory computer readable medium comprising computer program code which is configured to cause a processor and a memory to perform the method of FIG. 6.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/ method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A Controller Area Network (CAN) transceiver comprising processing circuitry configured to:
receive transmit-data (TX data), the TX data generated by a CAN controller to cause the CAN transceiver to transmit CAN signals that encode the TX data on the CAN bus; and
receive CAN signals encoding receive-data (RX data) via the CAN bus;
detect, in the RX data, one or more fields of a CAN frame; and
prevent the CAN transceiver from transmitting the TX data on the CAN bus at times corresponding to the one or more fields of the CAN frame detected in the RX data;
wherein preventing the CAN transceiver from transmitting the TX data on the CAN bus at the times corresponding to the one or more fields of the CAN frame detected in the RX data prevents an error frame in the TX data from being transmitted on the CAN bus;
wherein the processing circuitry is configured to store a security level parameter in memory coupled to the processing circuitry;
wherein a number of the one or more fields of the CAN frame detected in the RX data is a first number of fields when the security level parameter has a first value; and
wherein a number of the one or more fields of the CAN frame detected in the RX data is a second number larger that than first number when the security level parameter has a second value.

2. The CAN transceiver claim 1, wherein the processing circuitry is configured to change the security level parameter from the first value to the second value based on detection of one or more anomalous events in the TX data, the one or more anomalous events determined based on a predetermined behavior rule set.

3. The CAN transceiver claim 1, wherein the processing circuitry is configured to change the security level parameter from the second value to the first value based on non-detection, over a predetermined time period or over a predetermined number of frames, of one or more anomalous events in the transmit-data, the one or more anomalous events determined based on a predetermined behavior rule set.

4. The CAN transceiver of claim 1, wherein the processing circuitry is configured to prevent the CAN transceiver transmission from transmitting the TX data by:
modifying the TX data;
preventing a transmitter module of the CAN transceiver from receiving the TX data, wherein the transmitter module configured to transmit the TX data using differential voltage signals on the CAN bus; or
disabling an output of the transmitter module of the CAN transceiver.

5. The CAN transceiver of claim 1, wherein, the processing circuitry is configured, in response to detecting the error frame in the TX data, to modify the RX data to indicate to the CAN controller that the error frame was transmitted on the CAN bus.

6. The CAN transceiver claim 5, wherein the processing circuitry is configured, in response to preventing transmission of the TX data and modifying of the RX data, to cause the transceiver to transmit an overload flag on the CAN bus.

7. The CAN transceiver of claim 1, wherein the processing circuitry is further configured to:
   detect an error in the RX data according to one or more rules; and
   transmit an error signal or an error frame on the CAN bus in response to detecting the error in the RX data.

8. The CAN transceiver of claim 7, wherein the processing circuitry is further configured to transmit the error frame or the error signal at the times corresponding to the one or more fields of the CAN frame detected in the RX data.

9. The CAN transceiver of claim 7, wherein the one or more rules used for detecting the error in the RX data includes:
   a bit stuffing rule of a CAN protocol;
   a cyclical redundancy check (CRC) rule of the CAN protocol that defines a CRC field that includes data indicating whether data in a data field of the RX data is correct;
   a form error rule of the CAN protocol defining one or more expected values of predetermined bits in the CAN frame according to the CAN protocol; and
   a bit error rule of the CAN protocol that defines bit values in the TX data that should be present in the RX data.

10. The CAN transceiver claim 7, wherein based on said apparatus providing for transmission of the error frame, the processing circuitry is configured to allow transmission by the CAN transceiver of the TX data on the CAN bus.

11. The CAN transceiver of claim 1, wherein the processing circuitry is configured to:
    determine, based on the RX data and the TX data, during an arbitration field of a CAN frame, that a CAN arbitration was lost; and
    wherein the one or more fields of the CAN frame include:
    a data field;
    a portion of an arbitration field following a time arbitration is lost;
    a cyclic redundancy check field;
    an interframe space; or
    an end-of-frame field.

12. The CAN transceiver of claim 1, wherein the processing circuitry is configured to:
    determine, based on the TX data and the RX data, during an arbitration field of a CAN frame, that an arbitration was won; and
    wherein the one or more fields of the CAN frame comprises:
    an acknowledgement field;
    an end-of-frame field; or
    an interframe space.

\* \* \* \* \*